United States Patent
Ota et al.

(10) Patent No.: US 11,437,629 B2
(45) Date of Patent: Sep. 6, 2022

(54) HYDROPHILIC POROUS CARBON ELECTRODE AND MANUFACTURING METHOD OF SAME

(71) Applicant: Mitsubishi Chemical Corporation, Chiyoda-ku (JP)

(72) Inventors: Kyu Ota, Tokyo (JP); Hiroto Tatsuno, Tokyo (JP); Kazuhiro Sumioka, Tokyo (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 0 days.

(21) Appl. No.: 16/991,337

(22) Filed: Aug. 12, 2020

(65) Prior Publication Data

US 2020/0373588 A1   Nov. 26, 2020

Related U.S. Application Data

(63) Continuation of application No. PCT/JP2019/005027, filed on Feb. 13, 2019.

(30) Foreign Application Priority Data

Feb. 15, 2018 (JP) .............. JP2018-025086
Feb. 15, 2018 (JP) .............. JP2018-025411

(51) Int. Cl.

| H01M 4/96 | (2006.01) |
|---|---|
| H01M 4/04 | (2006.01) |
| H01M 4/86 | (2006.01) |
| H01M 4/88 | (2006.01) |
| H01M 8/18 | (2006.01) |
| H01M 4/02 | (2006.01) |

(52) U.S. Cl.
CPC .......... *H01M 4/96* (2013.01); *H01M 4/0438* (2013.01); *H01M 4/8605* (2013.01); *H01M 4/8875* (2013.01); *H01M 4/8882* (2013.01); *H01M 4/8892* (2013.01); *H01M 8/18* (2013.01); *H01M 2004/021* (2013.01)

(58) Field of Classification Search
CPC ....... H01M 2004/021; H01M 2220/10; H01M 4/0438; H01M 4/8605; H01M 4/8636; H01M 4/8668; H01M 4/8673; H01M 4/8875; H01M 4/8882; H01M 4/8892; H01M 4/96; H01M 8/18; H01M 8/188; Y02E 60/10; Y02E 60/50
See application file for complete search history.

(56) References Cited

U.S. PATENT DOCUMENTS

| 2003/0082374 A1 | 5/2003 | Frisk et al. |
| 2007/0037040 A1 | 2/2007 | Koyama et al. |
| 2007/0218347 A1 | 9/2007 | Takahashi et al. |
| 2012/0094215 A1 | 4/2012 | Satou et al. |

FOREIGN PATENT DOCUMENTS

| JP | 2005-507980 A | 3/2005 |
| JP | 2006-100155 A | 4/2006 |
| JP | 2007-48552 A | 2/2007 |
| JP | 2007-186823 A | 7/2007 |
| JP | 2007-250279 A | 9/2007 |
| JP | 2010-80286 A | 4/2010 |
| JP | 2011-29171 A | 2/2011 |
| JP | 2013-175384 A | 9/2013 |
| JP | 2017-27920 A | 2/2017 |

OTHER PUBLICATIONS

International Search Report dated May 14, 2019 in PCT/JP2019/005027 filed Feb. 13, 2019, (with English Translation), 4 pages.

*Primary Examiner* — Victoria H Lynch
(74) *Attorney, Agent, or Firm* — Oblon, McClelland, Maier & Neustadt, L.L.P.

(57) ABSTRACT

A hydrophilic porous carbon electrode which has excellent hydrophilicity, which has high reaction activity when used for a battery, and with which excellent battery characteristics is able to be obtained is provided. A hydrophilic porous carbon electrode is a sheet-form hydrophilic porous carbon electrode in which a carbon fiber is bonded using a resin carbide and has a contact angles $\theta_A$ of water on both surfaces in a thickness direction being 0 to 15° and a contact angle $\theta_B$ of water in a middle portion in the thickness direction being 0 to 15°. The hydrophilic porous carbon electrode is obtained by forming the carbon fiber and a binder fiber into a sheet, impregnating the sheet into a thermosetting resin, subjecting it to heat press processing, and then subjecting it to carbonization at 400 to 3000° C. in an inert atmosphere. The hydrophilic porous carbon electrode is transported and is subjected to a heat treatment while an oxidizing gas flows at 400 to 800° C. in a direction perpendicular to a direction in which the hydrophilic porous carbon electrode is transported to be subjected to hydrophilization.

17 Claims, No Drawings

HYDROPHILIC POROUS CARBON ELECTRODE AND MANUFACTURING METHOD OF SAME

The present invention relates to a hydrophilic porous carbon electrode and a manufacturing method of the same.

This application is a continuation application of International Application No. PCT/JP2019/005027, filed on Feb. 13, 2019, which claims the benefit of priority of the prior Japanese Patent Application No. 2018-025086, filed Feb. 15, 2018 and Japanese Patent Application No. 2018-025411, filed Feb. 15, 2018, the content of which is incorporated herein by reference.

BACKGROUND ART

Technical Field

For electrodes of batteries such as lithium ion batteries, fuel cells, and redox flow batteries, porous base materials in which carbon fibers having a short fiber length are dispersed and bonded with resin carbides are widely used. Among these batteries, in redox flow batteries in which sizes thereof may easily become larger and which have excellent durability, the porous base materials are used at they are as porous carbon electrodes.

Redox flow batteries usually include external tanks configured to store electrolytic solutions and electrolytic cells and electrochemical energy conversion, that is, charging/discharging is performed using electrodes incorporated in the electrolytic cells while electrolytic solutions containing active materials are transferred from the external tanks to the electrolytic cells through pumps. In order to obtain excellent battery characteristics in redox flow batteries, it is important that porous carbon electrodes provided in the electrolytic cells have excellent hydrophilicity and high reaction activity.

As a porous carbon electrode having enhanced hydrophilicity, Patent Document 1 describes a porous carbon electrode in which carbon fine particles having conductivity are adhered to a carbon fiber using an ion conductive binder. Patent Document 2 describes a porous carbon electrode using a carbon fiber whose surface is treated using an alkaline degreasing liquid. Patent Document 3 describes a porous carbon electrode using a carbon fiber to which a metal oxide is attached.

CITATION LIST

Patent Literature

[Patent Document 1]
Japanese Unexamined Patent Application, First Publication No. 2017-27920
[Patent Document 2]
Japanese Unexamined Patent Application, First Publication No. 2007-186823
[Patent Document 3]
Published Japanese Translation No. 2005-507980 of the PCT International Publication

SUMMARY OF INVENTION

Technical Problem

However, in redox flow batteries using conventional porous carbon electrodes as in Patent Documents 1 to 3, the battery characteristics are still insufficient and there is a demand for higher performance porous carbon electrodes.

An object of the present invention is to provide a hydrophilic porous carbon electrode which has excellent hydrophilicity, high reaction activity when used for a battery, and excellent battery characteristics and a manufacturing method of the same.

Solution to Problem

The present invention has the following constitution.
[1] A hydrophilic porous carbon electrode which is a sheet-like porous carbon electrode in which carbon fibers are bonded using a resin carbide and has contact angles $\theta_A$ of water with respect to both surfaces of the hydrophilic porous carbon electrode in a thickness direction of 0 to 15° and a contact angle $\theta_B$ of water in a middle portion of the hydrophilic porous carbon electrode in the thickness direction of 0 to 15°.
[2] In the hydrophilic porous carbon electrode according to [1], the contact angles $\theta_A$ of water on both surfaces of the hydrophilic porous carbon electrode in the thickness direction may be 0 to 10° and the contact angle $\theta_B$ of water in the middle portion of the hydrophilic porous carbon electrode in the thickness direction may be 0 to 15°.
[3] In the hydrophilic porous carbon electrode according to [1] or [2], differences between the contact angles $\theta_A$ of water on both surfaces of the hydrophilic porous carbon electrode in the thickness direction and the contact angle $\theta_B$ of water in the middle portion of the hydrophilic porous carbon electrode in the thickness direction may be 0 to 10°.
[4] In the hydrophilic porous carbon electrode according to any one of [1] to [3], the basis weight is 30 to 300 g/m² and the thickness is 0.10 to 0.80 mm.
[5] In the hydrophilic porous carbon electrode according to [4], the specific surface area is 1.0 to 1000 m²/g.
[6] In the hydrophilic porous carbon electrode according to [5], non-through holes with a size of an opening portion of 0.1 to 5.0 μm and a depth of 0.01 to 1.0 μm are formed in surfaces of the carbon fibers.
[7] In the hydrophilic porous carbon electrode according to [5] or [6], Ag is present on a surface of the porous carbon electrode and a penetration resistance is 3.0 to 6.0 mΩ·cm².
[8] In the hydrophilic porous carbon electrode according to [5], either or both of a Ti oxide and a Sn oxide are present on the surface of the porous carbon electrode.
[9] A manufacturing method of the hydrophilic porous carbon electrode according to any one of [1] to [8] includes: the following Steps (1) to (5): Step (1): a step of forming carbon fibers and a binder fiber into a sheet to obtain a carbon fiber sheet; Step (2): a step of impregnating the carbon fiber sheet with a thermosetting resin to obtain a resin-impregnated carbon fiber sheet; Step (3): a step of subjecting the resin-impregnated carbon fiber sheet to heat press processing to obtain a resin-cured carbon fiber sheet; Step (4): a step of subjecting the resin-cured carbon fiber sheet to carbonization at 400 to 3000° C. in an inert atmosphere to obtain a porous carbon electrode; and Step (5): a step of carrying out a hydrophilization treatment by transporting the porous carbon electrode and subjecting the porous carbon electrode to a heat treatment while causing an oxidizing gas at 400 to 800° C. to flow in a direction perpendicular to a direction in which the porous carbon electrode is transported.

[10] In the manufacturing method of the hydrophilic porous carbon electrode according to [9], the porous carbon electrode is subjected to a heat treatment for 0.5 to 60 minutes using the oxidizing gas.

[11] In the manufacturing method of the hydrophilic porous carbon electrode according to [9] or [10], in Step (5), the porous carbon electrode is further immersed in a nitric acid solution, subjected to an electrolytic treatment, washed with water, and dried.

[12] In the manufacturing method of the hydrophilic porous carbon electrode according to any one of [9] to [11], in Step (5), both surfaces of the porous carbon electrode are further subjected to an atmospheric pressure plasma treatment.

[13] In the manufacturing method of the hydrophilic porous carbon electrode according to any one of [9] to [12], in Step (4), the porous carbon electrode is further impregnated with a dispersion liquid of a metal oxide to support the metal oxide.

Another aspect of the present invention has the following constitution.

[A1] A hydrophilic porous carbon electrode is a sheet-like porous carbon electrode in which carbon fibers are bonded using a resin carbide and has contact angles of water on both surfaces of the hydrophilic porous carbon electrode in a thickness direction being 0 to 60° and a contact angle of water in a middle portion of the hydrophilic porous carbon electrode in the thickness direction being 0 to 60°.

[A2] In the hydrophilic porous carbon electrode according to [A1], the contact angles of water on both surfaces of the hydrophilic porous carbon electrode in the thickness direction are 0 to 40° and the contact angle of water in the middle portion of the hydrophilic porous carbon electrode in the thickness direction is 0 to 60°.

[A3] In the hydrophilic porous carbon electrode according to [A1] or [A2], differences between the contact angles of water on both surfaces of the hydrophilic porous carbon electrode in the thickness direction and the contact angle of water in the middle portion of the hydrophilic porous carbon electrode in the thickness direction are 0 to 20°.

[A4] In the hydrophilic porous carbon electrode according to any one of [A1] to [A3], the basis weight is 50 to 200 g/m² and the thickness is 0.150 to 0.600 mm.

[A5] A manufacturing method of a hydrophilic porous carbon electrode is a manufacturing method of the hydrophilic porous carbon electrode according to any one of [A1] to [A4] and has the following Steps (A1) to (A5): Step (A1): a step of forming carbon fibers and a binder fiber into a sheet to obtain a carbon fiber sheet; Step (A2): a step of impregnating the carbon fiber sheet with a thermosetting resin to obtain a resin-impregnated carbon fiber sheet; Step (A3): a step of subjecting the resin-impregnated carbon fiber sheet to heat press processing to obtain a resin-cured carbon fiber sheet; Step (A4): a step of subjecting the resin-cured carbon fiber sheet to carbonization at 400 to 3000° C. in an inert atmosphere to obtain a hydrophilic porous carbon electrode; and Step (A5): a step of subjecting the porous carbon electrode to a hydrophilization treatment to obtain a hydrophilic porous carbon electrode.

[A6] In the manufacturing method of the hydrophilic porous carbon electrode according to [A5], as the hydrophilization treatment, the porous carbon electrode is transported, caused to pass in a furnace at 400 to 800° C. in an air atmosphere, and subjected to a heat treatment for 0.5 to 60 minutes while causing a gas to flow in a direction perpendicular to a direction in which the porous carbon electrode is transported in the furnace.

[A7] In the manufacturing method of the hydrophilic porous carbon electrode according to [A5] or [A6], as the hydrophilization treatment, the porous carbon electrode is immersed in a nitric acid solution, subjected to an electrolytic treatment, washed with water, and dried.

[A8] In the manufacturing method of the hydrophilic porous carbon electrode according to [A6] or [A7], as the hydrophilization treatment, either or both of the heat treatment and the electrolytic treatment and an atmospheric pressure plasma treatment performed on both surfaces of the hydrophilic porous carbon electrode are performed.

Still another aspect of the present invention has the following constitution.

[B1] A porous carbon electrode which is a sheet-like porous carbon electrode in which carbon fibers are bonded using a resin carbide and has a thickness of 0.1 to 0.8 mm, a basis weight of 30 to 300 g/m², and a specific surface area of 1.0 to 1000 m²/g.

[B2] In the porous carbon electrode according to [B1], non-through holes with a size of an opening portion of 0.1 to 5.0 μm and a depth of 0.01 to 1.0 μm are formed in the carbon fibers.

[B3] In the porous carbon electrode according to [B1] or [B2], Ag is present on a surface of the porous carbon electrode and a penetration resistance is 3.0 to 6.0 mΩ·cm².

[B4] In the porous carbon electrode according to [B1], either or both of a Ti oxide and a Sn oxide are present on the surface of the porous carbon electrode.

[B5] In the porous carbon electrode according to [B3] or [B4], contact angles of water on both surfaces of the porous carbon electrode in a thickness direction and a contact angle of water in a middle portion of the porous carbon electrode in the thickness direction are all 0 to 60°.

[B6] A manufacturing method of a porous carbon electrode which is a manufacturing method of the porous carbon electrode according to any one of [B1] to [B5] and has the following Steps (B1) to (B6):

Step (B1): a step of forming carbon fibers and a binder fiber into a sheet to obtain a carbon fiber sheet; Step (B2): a step of impregnating the carbon fiber sheet in a thermosetting resin to obtain a resin-impregnated carbon fiber sheet; Step (B3): a step of subjecting the resin-impregnated carbon fiber sheet to heat press processing to obtain a resin-cured carbon fiber sheet; Step (B4): a step of subjecting the resin-cured carbon fiber sheet to carbonization at 400 to 3000° C. in an inert atmosphere to obtain a hydrophilic porous carbon electrode;

Step (B5): a step of impregnating the porous carbon sheet in a dispersion liquid of a metal oxide to obtain a metal oxide-supporting porous carbon sheet; and Step (B6): a step of transporting the metal oxide-supporting porous carbon sheet to pass in a furnace at 400 to 800° C. in an air atmosphere and subjecting the metal oxide-supporting porous carbon sheet to a heat treatment for 0.5 to 60 minutes while causing a gas to flow in a direction perpendicular to a direction in which the metal oxide-supporting porous carbon sheet is transported in the furnace to obtain a porous carbon electrode.

Advantageous Effects of Invention

A hydrophilic porous carbon electrode of the present invention has excellent hydrophilicity, high reaction activity when used for a battery, and excellent battery characteristics.

According to a manufacturing method of a hydrophilic porous carbon electrode of the present invention, it is possible to manufacture a hydrophilic porous carbon electrode which has excellent hydrophilicity, high reaction activity when used for a battery, and excellent battery characteristics.

DESCRIPTION OF EMBODIMENTS

A hydrophilic porous carbon electrode (hereinafter referred to as a "carbon electrode") of the present invention is a sheet-like porous carbon electrode in which carbon fibers are bonded using a resin carbide. In a carbon electrode, a plurality of carbon fibers are bonded using a resin carbide in a state in which the carbon fibers are dispersed in a sheet so that fiber directions thereof are randomly oriented. That is to say, the carbon electrode of the present invention is a carbon electrode formed of carbon paper.

The carbon electrode of the present invention can be suitably used for a redox flow battery.

Examples of the carbon fibers include polyacrylonitrile (PAN)-based carbon fibers, pitch-based carbon fibers, and rayon-based carbon fibers. Among these, PAN-based carbon fibers are preferable. As the carbon fibers, one kind may be used independently or a combination of two or more kinds may be used.

The average fiber length of the carbon fibers is preferably 2 to 30 mm, and more preferably 2 to 12 mm. That is to say, it is desirable that the carbon fibers be short carbon fibers. If the average fiber length of the carbon fibers is equal to or larger than the lower limit value of the above ranges, it is possible to easily obtain sufficient strength. If the average fiber length of the carbon fibers is equal to or smaller than the upper limit value of the above ranges, excellent dispersibility of the carbon fibers is provided.

The average fiber length of the carbon fibers is obtained by observing the carbon fibers through a microscope such as a scanning electron microscope at a magnification of 50 times or more, measuring fiber lengths of 50 short fibers which are randomly selected, and obtaining an average of the fiber lengths.

The average fiber diameter of the carbon fibers is preferably 3 to 20 μm, and more preferably 3 to 9 μm. If the average fiber diameter of the carbon fibers is equal to or larger than the lower limit value of the above range, excellent dispersibility of the carbon fibers is provided. Thus, a carbon fiber sheet which is uniform in surface direction can be obtained. If the average fiber diameter of the carbon fibers is equal to or smaller than the upper limit value of the above range, a carbon fiber sheet having high smoothness can be obtained.

The average fiber diameter of the carbon fibers is obtained by observing carbon fiber cross sections through a microscope such as a scanning electron microscope at a magnification of 50 times or more, measuring fiber diameters of 50 single fibers which are randomly selected, and obtaining an average of values of these fiber diameters. In the case of a carbon fiber having a flat cross section, that is, when the cross section has a longer axis and a shorter axis, the longer axis is the fiber diameter of the fiber.

The tensile elastic modulus of the carbon fibers is preferably 200 to 600 GPa, and more preferably 200 to 450 GPa.

The tensile elastic modulus of the carbon fibers is obtained through a single fiber tensile test. In the single fiber tensile test, one single fiber is taken out from the carbon fibers and an elastic modulus of the single fiber is measured using a universal testing machine under test conditions such as a test length of 5 mm and a pulling rate of 0.5 mm/min. A value obtained by selecting 50 single fibers from the same carbon fibers, measuring elastic moduli thereof, and obtaining an average of values of the elastic moduli is assumed to be a tensile elastic modulus of the carbon fibers.

The tensile strength of the carbon fibers is preferably 3000 to 7000 GPa, and more preferably 3500 to 6500 GPa.

The tensile strength of the carbon fibers is obtained through a single fiber tensile test. In the single fiber tensile test, one single fiber is taken outside of the carbon fibers and the strength of the single fiber is measured using a universal testing machine under test conditions such as a test length 5 mm and a pulling rate of 0.5 mm/min. A value obtained by selecting 50 single fibers from the same carbon fibers, measuring strengths thereof, and obtaining the average of values of the strengths is assumed to be a tensile strength of the carbon fibers.

The carbon fiber is obtained by impregnating a bundle of, for example, several thousand to tens of thousands of carbon fiber filaments with a sizing agent and continuously or discontinuously cutting a dried and bundled carbon fiber bundle using a roving cutter, a guillotine cutter, or the like into predetermined lengths.

It is desirable that non-through holes having opening sizes of 0.1 to 5.0 μm and depths of 0.01 to 1.0 μm be formed in a surface of the carbon fiber. Thus, since the specific surface area of the carbon electrode is further increased, the carbon electrode has high reaction activity when used for a battery and superior battery characteristics. Such non-through holes are formed in a surface of the carbon fiber, for example, by subjecting a porous carbon electrode having $Ag_2O$ supported therein to a heat treatment which will be described later.

The opening sizes of the non-through holes are 0.1 to 5.0 μm, preferably 0.1 to 4.0 μm, and more preferably 0.1 to 3.0 μm. If the opening sizes are equal to or larger than the lower limit value of the above range, the specific surface area of the carbon electrode is further increased and the reaction activity when the carbon electrode is used for a battery is improved. If the opening sizes are equal to or smaller than the upper limit value of the above range, a carbon electrode having sufficient strength can be obtained.

The opening sizes of the non-through holes refer to a diameter of a circumscribed circle of the opening portion when the opening portion is viewed from in front.

The depths of the non-through holes are 0.01 to 1.0 μm, preferably 0.05 to 1.0 μm, and more preferably 0.1 to 1.0 μm. If the depths of the non-through holes are equal to or larger than the lower limit value of the above range, the specific surface area of the carbon electrode is further increased and the reaction activity when the carbon electrode is used for a battery is improved. If the depths of the non-through holes are equal to or smaller than the upper limit value of the above range, a carbon electrode having sufficient strength can be obtained.

The depths of the non-through holes refer to depths of the non-through holes corresponding to the deepest portions thereof.

The basis weight of the carbon fiber in the carbon electrode is preferably 10 to 140 $g/m^2$, and more preferably 25 to 100 $g/m^2$. If the basis weight of the carbon fiber is equal to or larger than the lower limit value of the above range, a carbon electrode having sufficient strength can be obtained. If the basis weight of the carbon fiber is equal to or smaller than the upper limit value of the above range, a carbon electrode in which carbon fibers are uniformly dispersed can be obtained.

The amount of the carbon fibers in the carbon electrode is preferably 40 to 80% by mass, and more preferably 50 to 70% by mass with respect to the total mass of the carbon electrode. If the amount of the carbon fibers is equal to or larger than the lower limit value of the above range, it is possible to easily obtain sufficient strength. If the amount of the carbon fibers is equal to or smaller than the upper limit value of the above range, the amount of the resin carbide is increased relatively. Thus, the carbon fibers are sufficiently bonded to each other.

The resin carbide is obtained by carbonizing a resin. A resin carbide obtained by subjecting a binder resin or a binder fiber to be used when the carbon electrode is manufactured to a carbonization treatment is contained in a carbon electrode as a resin carbide.

As the binder resin, a binder resin having a binding force with the carbon fiber and subjected to carbonization may be used. In addition, examples of the binder resin include thermosetting resins such as phenolic resins and furan resins. A binder resin may be used independently or a combination of two or more of binder resins may be used.

Examples of the phenolic resins include resol type phenolic resins obtained through the reaction of phenols and aldehydes in the presence of an alkali catalyst. Resins obtained by dissolving and mixing a novolac type solid phenolic resin having heat-sealing properties generated through the reaction of phenols and aldehydes in the presence of an acidic catalyst into a resol type fluid phenolic resin may be used. In this case, a use of a self-crosslinking type containing, for example, hexamethylenediamine as a curing agent is preferable.

A commercially available product may be used as the phenolic resin.

Examples of the phenols include phenol, resorcin, cresol, and xylol. As the phenols, one kind may be used independently or a combination of two or more kinds may be used.

Examples of the aldehydes include formalin, paraformaldehyde, and furfural. One kind of aldehyde may be used independently or a combination of two or more kinds of aldehyde may be used.

As the phenolic resin, a water-dispersible phenolic resin or a water-soluble phenolic resin may be used.

Examples of the water-dispersible phenolic resin include water-dispersible phenolic resins referred to as resol type phenolic resin emulsions or aqueous dispersions described in Japanese Unexamined Patent Application, First Publication No. 2004-307815, Japanese Unexamined Patent Application, First Publication No. 2006-56960, and the like.

Examples of the water-soluble phenolic resin include the resol type phenolic resins having good solubility in water which are described in Japanese Unexamined Patent Application, First Publication No. 2009-84382 and the like.

The amount of the resin carbide in the carbon electrode is preferably 20 to 60% by mass, and more preferably 25 to 50% by mass with respect to the total mass of the carbon electrode. If the amount of the resin carbide is equal to or larger than the lower limit value of the above ranges, the carbon fibers are sufficiently bonded to each other. If the amount of the resin carbide is equal to or smaller than the upper limit value of the above ranges, the amount of the carbon fibers is increased relatively. Thus, it is possible to easily obtain sufficient strength.

The carbon electrode may contain components other than carbon fibers and a resin carbide as required. As the other components, carbon powder is an exemplary example. When the carbon electrode contains carbon powder, it can be expected that there will be an improvement in conductivity.

Examples of carbon powder include graphite powder, carbon black, milled fibers, carbon nanotubes, carbon nanofibers, coke, activated carbon, and amorphous carbon. One kind of carbon powder may be used independently or a combination of two or more kinds of carbon powder may be used.

The graphite powder has a highly crystalline graphite structure and an average particle size of primary particles thereof is generally several μm to several hundreds μm.

Examples of the graphite powder include pyrolytic graphite, spheroidal graphite, scaly graphite, lump graphite, earthy graphite, artificial graphite, and expanded graphite and pyrolytic graphite, spheroidal graphite, or scaly graphite is preferable in view of exhibiting conductivity.

Carbon black is generally present as a structured material (an agglomerate) in which primary particles having an average particle size of several tens of μm are fused to each other to form structures and the structures are joined through van der Waals forces. Carbon black has a significantly larger number of particles per unit mass than that of graphite powder and agglomerates therein are connected in a three-dimensional network to form macroscopic conductive paths at a certain critical concentration or higher.

Examples of carbon black include acetylene black, Ketjen black, furnace black, channel black, lamp black, and thermal black.

The milled fiber may be crushed virgin carbon fibers or may be a crushed product of a recycled product such as a carbon fiber reinforced thermosetting resin molded product, a carbon fiber reinforced thermoplastic resin molded product, and a prepreg. The carbon fiber as a raw material of the milled fiber may be PAN-based carbon fibers, pitch-based carbon fibers, or rayon-based carbon fibers.

When the carbon electrode contains carbon powder, the amount of the carbon powder in the carbon electrode is preferably 1 to 40% by mass, and more preferably 5 to 30% by mass with respect to the total mass of the carbon electrode. If the amount of carbon powder is equal to or larger than the lower limit value of the above range, the conductivity is improved, the specific surface area of the carbon electrode is increased due to surface irregularities derived from the carbon powder, and the reaction activity is improved. If the amount of carbon powder is equal to or smaller than the upper limit value of the above range, it is difficult to close a path along which the electrolytic solution diffuses.

The carbon electrode of the present invention has contact angles $\theta_A$ of water on both surfaces in a thickness direction of 0 to 15° and a contact angle $\theta_B$ of water in a middle portion in the thickness direction of 0 to 15°. When all of the contact angles $\theta_A$ and the contact angle $\theta_B$ of the carbon electrode are 0 to 15°, the reaction activity when the carbon electrode is used for a battery is increased and excellent battery characteristics can be obtained.

The middle portion of the carbon electrode refers to a portion between 40 and 60% of the total thickness of the carbon electrode from a surface of the carbon electrode in the thickness direction of the carbon electrode.

The contact angles $\theta_A$ of the carbon electrode are 0 to 15°, preferably 0 to 13°, more preferably 0 to 10°, and still more preferably 0 to 5°. If the contact angles $\theta_A$ are equal to or larger than these upper limit values, excellent hydrophilicity is provided, high reaction activity of the electrode is provided, and excellent battery characteristics can be obtained. The contact angles $\theta_A$ of both surfaces of the carbon electrode may be the same or different.

The contact angles $\theta_A$ of water in the carbon electrode are measured using a commercially available contact angle measuring device.

The contact angle $\theta_B$ of the carbon electrode is 0 to 15°, preferably 0 to 13°, more preferably 0 to 10°, and still more preferably 0 to 5°. If the contact angle $\theta_B$ is equal to or smaller than the upper limit value, the electrolytic solution easily enters into the inside of the electrode, the reaction activity is increased also inside the electrode, and excellent battery characteristics can be obtained.

The contact angle $\theta_B$ of water in the carbon electrode is measured using a commercially available contact angle measuring device.

In the present invention, it is desirable that the contact angles $\theta_A$ be 0 to 10° and the contact angle $\theta_B$ be 0 to 15°. In this case, the reaction activity of the electrode is further increased and superior battery characteristics can be obtained.

Differences between the contact angles $\theta_A$ and the contact angle $\theta_B$ of the carbon electrode are preferably 0 to 10°, more preferably 0 to 5°, and still more preferably 0 to 2°. If the difference between the contact angles $\theta_A$ and the contact angle $\theta_B$ is equal to or smaller than the upper limit value, the reaction activity is increased over the entire electrode in the thickness direction and more excellent battery characteristics can be obtained.

In the present invention, it is particularly desirable that differences between both of the contact angles $\theta_A$ of both surfaces of the carbon electrode in the thickness direction and the contact angle $\theta_B$ be within the above range.

It is desirable that the carbon electrode of the present invention have a thickness of 0.10 to 0.80 mm and a basis weight of 30 to 300 g/m² and it is more desirable that a specific surface area be 1.0 to 1000 m²/g. When the thickness, the basis weight, and the specific surface area of the carbon electrode are controlled such that they are within the above ranges, the reaction activity when the carbon electrode is used for a battery is further increased and more excellent battery characteristics can be obtained.

The specific surface area of the carbon electrode is preferably 1.0 to 1000 m²/g, more preferably 1.0 to 600 m²/g, still more preferably 1.0 to 400 m²/g, particularly preferably 1.0 to 200 m²/g, and most preferably 1.0 to 100 m²/g. If the specific surface area is equal to or larger than the lower limit value of the above range, the reaction activity of the electrode is improved. If the specific surface area is equal to or smaller than the upper limit value of the above range, the electrolytic solution is easily adopted and battery characteristics are improved.

The specific surface area of the carbon electrode is measured using a mercury intrusion method.

The basis weight of the carbon electrode is preferably 30 to 300 g/m², more preferably 40 to 280 g/m², still more preferably 50 to 200 g/m², and particularly preferably 50 to 130 g/m². If the basis weight of the carbon electrode is equal to or larger than the lower limit value of the above range, high sheet strength is provided, excellent handleability is provided, and the carbon electrode functions satisfactorily as an electrode. If the basis weight of the carbon electrode is equal to or smaller than the upper limit value of the above range, a uniform carbon electrode with less unevenness of the basis weight can be obtained and high productivity is provided.

The thickness of the carbon electrode is preferably 0.10 to 0.80 mm, more preferably 0.10 to 0.70 mm, still more preferably 0.15 to 0.60 mm, and particularly preferably 0.19 to 0.60 mm. If the thickness of the carbon electrode is equal to or larger than the lower limit value of the above range, a carbon electrode having a sufficient reaction surface area can be obtained. If the thickness of the carbon electrode is equal to or smaller than the upper limit value of the above range, a carbon electrode with less pressure loss when the electrolytic solution is transferred can be obtained. Furthermore, high productivity is provided because the carbon electrode can be rolled up in a roll shape.

In the present invention, it is desirable that Ag be present on a surface of the porous carbon electrode and a penetration resistance be 3.0 to 6.0 mΩ·cm². That is to say, it is desirable that Ag be present on the carbon fiber and the resin carbide which form the porous carbon electrode and the penetration resistance be controlled in the above range. Thus, the conductivity of the carbon electrode and the battery characteristics when the carbon electrode is used for a battery is further improved.

In the porous carbon electrode, Ag may be present uniformly in the thickness direction or Ag may be unevenly distributed in a surface layer. For example, as described above, when a porous carbon sheet is impregnated in a dispersion liquid having $Ag_2O$ dispersed therein and subjected to a heat treatment, it is possible to deposit Ag on surfaces of the carbon fiber and the resin carbide of the porous carbon electrode.

The penetration resistance of the carbon electrode whose surface having Ag present thereon is preferably 3.0 to 6.0 mΩ·cm², more preferably 3.0 to 5.8 mΩ·cm², still more preferably 3.0 to 5.6 mΩ·cm². If the penetration resistance is equal to or larger than the lower limit value of the above range, a carbon electrode having a sufficient reaction area is obtained. If the penetration resistance is equal to or smaller than the upper limit value of the above range, the conductivity of the carbon electrode is improved and the battery characteristics when the carbon electrode is used for a battery is further improved.

The penetration resistance of the carbon electrode is a resistance value of the electrode per unit area in the thickness direction and is measured using the following method. A circular sample piece of 10.2 cm² punched from a carbon electrode is disposed between a pair of conductive plates, the voltage when a current of 10 mA flows while the conductive plates are pressed with 1020 N from above and below is measured, and the resistance value per unit area of the carbon electrode is calculated. It is possible to use an ohmmeter to measure the resistance value.

The amount of Ag to be supported in the carbon electrode may be adjusted so that the penetration resistance is within the above range and is preferably 0.1 to 10 parts by mass, and more preferably 0.1 to 5.0 parts by mass with respect to 100 parts by mass of the total mass of the carbon fiber and the resin carbide. If the amount of Ag to be supported is equal to or larger than the lower limit value of the above range, the conductivity of the carbon electrode is improved and the battery characteristics when the carbon electrode is used for a battery is further improved. If the amount of Ag to be supported is equal to or smaller than the upper limit value of the above range, it is difficult to close a path along which the electrolytic solution diffuses.

In the present invention, either or both of a Ti oxide and a Sn oxide may be present on the surface of the porous carbon electrode. That is to say, either or both of a Ti oxide and a Sn oxide may be present on the surfaces of the carbon fiber and the resin carbide forming the porous carbon electrode. The presence of the Ti oxide and the Sn oxide improves the hydrophilicity of the electrode and further increases the reaction activity of the electrode. Thus, the battery characteristics when the carbon electrode is used for a battery is further improved.

In the porous carbon electrode, either or both of the Ti oxide and the Sn oxide may be present uniformly in the thickness direction or may be unevenly distributed in the surface layer.

For example, as will be described later, when the porous carbon electrode is impregnated in a dispersion liquid having the Ti oxide and the Sn oxide dispersed therein and is subjected to a heat treatment, the Ti oxide and the Sn oxide can be present on the surfaces of the carbon fiber and the resin carbide of the porous carbon electrode.

Examples of the Ti oxide include $TiO_2$.

Examples of the Sn oxide include SnO and $SnO_2$ and the Sn oxide is preferably $SnO_2$.

The amounts of the Ti oxide and the Sn oxide to be supported in the carbon electrode are more preferably 0.1 to 10 parts by mass, and still more preferably 0.1 to 5 parts by mass with respect to 100 parts by mass of the total mass of the carbon fiber and the resin carbide. If the amounts of the Ti oxide and the Sn oxide to be supported are equal to or larger than the lower limit value of the above range, the hydrophilicity of the carbon electrode is improved and the battery characteristics when the carbon electrode is used for a battery is further improved. If the amounts of the Ti oxide and the Sn oxide to be supported are equal to or smaller than the upper limit value of the above range, it is difficult to close a path along which the electrolytic solution diffuses.

(Manufacturing Method)

Examples of a manufacturing method of a carbon electrode of the present invention include a method including the following Steps (1) to (5):

Step (1): a step of forming carbon fibers and a binder fiber into a sheet to obtain a carbon fiber sheet;

Step (2): a step of impregnating the carbon fiber sheet in a thermosetting resin to obtain a resin-impregnated carbon fiber sheet;

Step (3): a step of subjecting the resin-impregnated carbon fiber sheet to heat press processing to obtain a resin-cured carbon fiber sheet;

Step (4): a step of subjecting the resin-cured carbon fiber sheet to carbonization at 400 to 3000° C. in an inert atmosphere to obtain a porous carbon electrode; and Step (5): a step of carrying out a hydrophilization treatment by transporting the porous carbon electrode and subjecting the porous carbon electrode to a heat treatment while causing an oxidizing gas at 400 to 800° C. to flow in a direction perpendicular to a direction in which the porous carbon electrode is transported.

In Step (1), the carbon fiber sheet is formed using the carbon fibers and the binder fiber. It is possible to easily form the carbon fibers into a sheet when the binder fiber is used together.

Examples of the binder fiber include polyvinyl alcohol (PVA) fiber, polyvinyl acetate fiber, polyethylene fiber, polyethylene terephthalate (PET) fiber, and polyethylene (PE) pulp. Among them, PVA fiber and polyethylene fiber are preferable because they have an excellent binding force and can more effectively prevent carbon fibers from falling off. As the binder fiber, one kind may be used independently or a combination of two or more kinds may be used.

The amount of the binder fiber to be used is preferably 5 to 100 parts by mass, preferably 10 to 100 parts by mass, more preferably 40 to 100 parts by mass, and particularly preferably 15 to 60 parts by mass with respect to 100 parts by mass of the total mass of the carbon fibers. If the amount of the binder fiber to be used is equal to or larger than the lower limit value of the above range, it is possible to more effectively prevent the carbon fibers from falling off. If the amount of the binder fiber to be used is equal to or smaller than the upper limit value of the above range, a carbon fiber sheet having sufficient strength can be obtained. Furthermore, a carbon electrode having high liquid permeability can be obtained.

Examples of a method of forming carbon fibers and a binder fiber into a sheet include a wet method of dispersing carbon fibers and a binder fiber in a liquid medium and making paper and a paper making method such as a dry method in which carbon fibers and a binder fiber are dispersed in air and piled up. A wet method is preferable in view of sheet strength and fiber dispersion uniformity.

A liquid medium may be any medium in which carbon fibers and a binder fiber are not dissolved, examples thereof include water and organic solvents such as methanol, ethanol, ethylene glycol, and propylene glycol, and water is preferable in view of productivity.

The carbon fiber sheet may be manufactured using a continuous method or a batch method. The continuous method is preferable in view of the productivity and the mechanical strength of the carbon fiber sheet.

The basis weight of the carbon fiber sheet is preferably 10 to 200 $g/m^2$.

The thickness of the carbon fiber sheet is preferably 100 to 2000 μm.

It is desirable to subject the carbon fiber sheet to an entanglement treatment to form a carbon fiber sheet having an entangled structure.

Examples of the entanglement treatment include a machine entanglement method such as a needle punching method, a high-pressure liquid jet method such as a water jet punching method, and a high-pressure gas injection method such as a steam jet punching method. The high-pressure liquid jet method is preferable because it is possible to easily minimize the breakage of carbon fibers due to the entanglement treatment and easily obtain an appropriate entanglement property.

In the high-pressure liquid jet method, for example, a carbon fiber sheet is placed above a support member having a substantially smooth surface, a liquid columnar flow, a liquid fan flow, a liquid slit flow, and the like to be injected at a pressure of 1 MPa or more act on the carbon fiber sheet, and fibers in the carbon fiber sheet are entangled. As the support member having a substantially smooth surface, it is possible to use a support member in which a pattern of the support member is not formed in the carbon fiber sheet which has been subjected to the entanglement treatment and from which injected liquid is quickly removed. Specific examples thereof include a 30 to 200 mesh wire net, a plastic net, or a roll.

After the carbon fiber sheet is manufactured above the support member having a substantially smooth surface, subsequently, continuously performing the entanglement treatment using the high-pressure liquid jet method or the like is preferable in view of the productivity.

A liquid used in the high-pressure liquid jet method may be any liquid which does not dissolve fibers to be treated and water and deionized water are preferable. Water may be hot water.

In the case of a columnar flow, a nozzle hole diameter of a high-pressure liquid jet nozzle is preferably 0.06 to 1.0 mm, and more preferably 0.1 to 0.3 mm.

The distance between a nozzle injection hole and a carbon fiber sheet during processing is preferably 0.5 to 5 cm.

The pressure of a liquid is preferably 1 MPa or more, and more preferably 1.5 mPa or more in view of the entanglement of fibers.

The entanglement treatment is repeatedly performed multiple times. For example, after a carbon fiber sheet is subjected to the entanglement treatment, a carbon fiber sheet may be further laminated on the treated carbon fiber sheet and subjected to the entanglement treatment. In addition, after a carbon fiber sheet is subjected to the entanglement treatment from one surface side, the carbon fiber sheet may be turned upside down and entangled again from the opposite side.

After the carbon fiber sheet is subjected to the entanglement treatment using the high-pressure liquid jet method, the carbon fiber sheet may be dried. The drying method is not particularly limited and examples thereof include a heat treatment using a high-temperature atmosphere furnace or a far-infrared heating furnace and a heat treatment using a hot plate, a hot roll, or the like.

The drying temperature can be, for example, 20 to 200° C.

The drying time can be, for example, 1 minute to 24 hours.

In Step (2), for example, a resin-impregnated carbon fiber sheet is obtained by impregnating a carbon fiber sheet in a resin composition containing a thermosetting resin or a thermosetting resin and other components such as a carbon powder.

An impregnation method is not particularly limited and examples thereof include a method of applying a dispersion liquid having a thermosetting resin or a resin composition dispersed therein on a surface of a carbon fiber sheet and a method supplying a dispersion liquid to a carbon fiber sheet through a dip-nip method using a squeezing device. A method in which a resin film made of a thermosetting resin or a resin composition and a carbon fiber sheet overlap, are heated, are pressed, and are subjected to transferring may be used.

As a dispersion medium, water, alcohol, dimethylformamide, and demethylacetamide are preferable in view of handleability and production costs. When water is used as the dispersion medium, a dispersant such as a surfactant may be used to disperse a resin and a carbon powder.

The amount of a thermosetting resin to be impregnated in a carbon fiber sheet is preferably 50 to 200 parts by mass, and more preferably 80 to 150 parts by mass with respect to 100 parts by mass of a carbon fiber sheet.

An impregnation treatment may be repeatedly performed multiple times. For example, after a carbon fiber sheet is subjected to the impregnation treatment, a carbon fiber sheet may be laminated on the treated carbon fiber sheet and subjected to the impregnation treatment. In addition, after the carbon fiber sheet is subjected to the impregnation treatment from one surface side, the carbon fiber sheet may be turned upside down and subjected to the impregnation treatment again from the opposite side.

After the resin-impregnated carbon fiber sheet is subjected to the impregnation treatment, the resin-impregnated carbon fiber sheet may be dried. The drying method is not particularly limited and examples thereof include a heat treatment using a high-temperature atmosphere furnace or a far-infrared heating furnace and a heat treatment using a hot plate, a hot roll, or the like.

The drying temperature can be, for example, 40 to 120° C.

The drying time can be, for example, 0.1 minutes to 24 hours.

In Step (3), a resin-cured carbon fiber sheet is obtained by subjecting a resin-impregnated carbon fiber sheet to heat press processing and curing a thermosetting resin in the resin-impregnated carbon fiber sheet.

Examples of a method of subjecting a resin-impregnated carbon fiber sheet to heat press processing include a method of hot-pressing a resin-impregnated carbon fiber sheet from both upper and lower sides using smooth rigid plates and a method of performing hot-pressing using a continuous belt press device. It is desirable that the continuous belt press device be used as heat press processing of a resin-impregnated carbon fiber sheet in the case of the continuous method.

Examples of a pressing method in the continuous belt press device include a method of applying linear pressure to a belt using a roll press and a method of performing pressing through surface pressure using a hydraulic head press. A method of performing pressing through surface pressure using a hydraulic head press because a smoother carbon electrode can be obtained.

At the time of hot pressing, it is desirable to apply a release agent applied to a rigid plate or a belt in advance so that a thermosetting resin or the like is not attached or arrange release paper between the resin-impregnated carbon fiber sheet and a rigid plate and a belt.

Although the heating temperature at the time of hot pressing also depends on a curing temperature of a thermosetting resin, the heating temperature is preferably 100 to 400° C., more preferably 150 to 380° C., and still more preferably 180 to 360° C. If the heating temperature is equal to or higher than the lower limit value of the above range, the thermosetting resin is easily cured. If the heating temperature is equal to or lower than the upper limit value of the above range, it is easy to prevent the thermosetting resin and the binder fiber from burning out.

The pressure to be pressed at the time of hot pressing is preferably 1 to 20 MPa, and more preferably 5 to 15 MPa. If the pressure is equal to or higher than the lower limit value of the above range, it is possible to easily obtain a carbon electrode having a smooth surface. If the pressure is equal to or lower than the upper limit value of the above range, a carbon fiber is not easily broken.

The hot pressing time is preferably 0.1 to 5.0 minutes, and more preferably 0.1 to 2.0 minutes.

In Step (4), a porous carbon electrode is obtained by subjecting a resin-cured carbon fiber sheet to carbonization.

The carbonization of the resin-cured carbon fiber sheet is performed in an inert atmosphere to enhance the conductivity of the carbon electrode. It is desirable to use an inert gas such as nitrogen or argon.

The heating temperature at the time of a carbonization treatment is 400 to 3000° C., preferably 600 to 2500° C., and more preferably 1000 to 2300° C. If the heating temperature at the time of a carbonization treatment is equal to or higher than the lower limit value of the above range, it is possible to easily obtain a carbon electrode having excellent conductivity. If the heating temperature at the time of a carbonization treatment is equal to or lower than the upper limit value of the above range, it is possible to obtain a carbon electrode having excellent reactivity.

The carbonization treatment time can be 1 minutes to 1 hour.

In Step (4), it is desirable to impregnate a porous carbon electrode in a dispersion liquid of a metal oxide to further support the metal oxide. Thus, the above-described non-through holes are formed in the carbon electrode and the specific surface area is increased.

Examples of the metal oxide include $Ag_2O$, a Ti oxide ($TiO_2$), and a Sn oxide ($SnO$ and $SnO_2$). As the metal oxide, one kind may be used independently or a combination of two or more kinds may be used.

Examples of the dispersion medium configured to disperse the metal oxide include water and alcohol. Water may be deionized water. When water is used as the dispersion medium, a dispersant such as a surfactant may be used.

The amount of the metal oxide in the dispersion liquid is preferably 0.5 to 20% by mass, and more preferably 0.5 to 10% by mass with respect to the total mass of the dispersion liquid.

The amount of a metal oxide to be supported in a porous carbon electrode having the metal oxide supported therein is preferably 0.1 to 10 parts by mass, and more preferably 0.1 to 5 parts by mass with respect to 100 parts by mass of the total mass of carbon fibers and a resin carbide.

The impregnation treatment of the dispersion liquid of the metal oxide may be repeatedly performed multiple times. For example, after a porous carbon electrode is subjected to the impregnation treatment, a porous carbon electrode may be further laminated on the treated porous carbon electrode and subjected to the impregnation treatment. In addition, after the porous carbon electrode is subjected to the impregnation treatment from one surface side, the porous carbon electrode may be turned upside down and subjected to the impregnation treatment again from the opposite side.

After the porous carbon electrode is subjected to the impregnation treatment, the porous carbon electrode having the metal oxide supported therein may be dried. The drying method is not particularly limited and examples thereof include a heat treatment using a high-temperature atmosphere furnace or a far-infrared heating furnace and a heat treatment using a hot plate, a hot roll, or the like.

The drying temperature of the porous carbon electrode having the metal oxide supported therein can be, for example, 90 to 300° C.

The drying time of the porous carbon electrode having the metal oxide supported therein can be, for example, 0.5 minutes to 2 hours.

In Step (5), a porous carbon electrode is transported and is subjected to a heat treatment while causing an oxidizing gas at 400 to 800° C. to flow in a direction perpendicular to a direction in which the porous carbon electrode is transported. Thus, the porous carbon electrode is subjected to hydrophilization and a carbon electrode in which the conditions such as the contact angle of water are satisfied is obtained. For example, a method in which the porous carbon electrode is transported, passes through a furnace in an air atmosphere of 400 to 800° C., and is subjected to a heat treatment while causing an oxidizing gas to flow in a direction perpendicular to a direction in which the porous carbon electrode is transported in the furnace is an exemplary example.

Examples of the oxidizing gas include oxygen, air, and carbon dioxide. Among them, air is preferable in view of use costs. As the oxidizing gas, one kind may be used independently or a combination of two or more kinds may be used.

A temperature in a furnace is 400 to 800° C., preferably 500 to 750° C., and more preferably 550 to 700° C. If the temperature in a furnace is equal to or higher than the lower limit value of the above range, it is possible to easily obtain a carbon electrode having excellent hydrophilicity and high reaction activity in a battery. If the temperature in a furnace is equal to or lower than the upper limit value of the above range, a carbon electrode having sufficient strength can be obtained.

A heat treatment time is preferably 5 to 60 minutes, more preferably 0.5 to 10 minutes, and still more preferably 0.5 to 5 minutes. If the heat treatment time is equal to or larger than the lower limit value of the above range, it is possible to easily obtain a carbon electrode having excellent hydrophilicity. If the heat treatment time is equal to or smaller than the upper limit value of the above range, high productivity is provided.

When $Ag_2O$ is used as the metal oxide in Step (4), a reduction reaction represented by $2Ag_2O \rightarrow 4Ag+O_2$ occurs during a heat treatment, Ag is deposited on a surface of the carbon fiber and the resin carbide, and a carbon electrode having excellent conductivity can be obtained.

Also, $Ag_2O$ acts as an oxidizing agent and a functional group such as a carboxy group and a hydroxy group is introduced into carbon fibers. In addition, non-through holes are formed in surfaces of the carbon fibers and the specific surface area of the porous carbon electrode is further increased. Thus, since the functional group is introduced at a high density in the carbon electrode, the reaction activity of the electrode is further increased. The formation of the non-through holes in the surface of the carbon fiber is presumed to be caused by the reduction reaction.

When a Ti oxide ($TiO_2$) or a Sn oxide ($SnO$ and $SnO_2$) is used as the metal oxide in Step (4), the metal oxide is present on surfaces of carbon fibers and a resin carbide of the carbon electrode to be obtained and a carbon electrode having more excellent hydrophilicity can be obtained.

As the hydrophilization treatment, a method in which, in addition to a heat treatment using an oxidizing gas, a porous carbon electrode is immersed in a nitric acid solution, subjected to an electrolytic treatment, washed with water, and dried may be adopted. In this case, the electrolytic treatment may be performed after the heat treatment using an oxidizing gas is performed or the heat treatment using an oxidizing gas may be performed after the electrolytic treatment is performed.

Examples of the nitric acid solution include an aqueous solution having a nitric acid concentration of 0.1 to 13.0 mol/L and the nitric acid concentration is preferably 0.5 to 5 mol/L.

The temperature of the nitric acid solution at the time of an electrolytic treatment is preferably 5 to 40° C., and more preferably 10 to 30° C. If the temperature is equal to or higher than the lower limit value of the above range, it is possible to easily obtain a carbon electrode having excellent hydrophilicity. If the temperature is equal to or lower than the upper limit value of the above range, high productivity is provided.

The treatment time of the electrolytic treatment is preferably 0.1 to 5.0 minutes, and more preferably 0.5 to 3.0 minutes. If the treatment time is equal to or larger than the lower limit value of the above range, it is possible to easily obtain a carbon electrode having excellent hydrophilicity. If the treatment time is equal to or smaller than the upper limit value of the above range, high productivity is provided.

As the hydrophilization treatment, in addition to the heat treatment using an oxidizing gas or the heat treatment using an oxidizing gas and the electrolytic treatment, an atmospheric pressure plasma treatment may be performed on both surfaces of the porous carbon electrode. The order of the atmospheric pressure plasma treatment is not particularly limited, may be performed before the heat treatment or the electrolytic treatment, may be performed after the heat treatment or the electrolytic treatment, or may be performed between the heat treatment and the electrolytic treatment.

The atmospheric pressure plasma treatment may be a direct method or a remote method. The direct method is a method in which a porous carbon electrode is arranged between two flat plate electrodes arranged in parallel with each other and is subjected to processing. The remote method is a method in which plasma generated between electrodes is sprayed onto a porous carbon electrode and is subjected to processing.

In the plasma treatment, an introduction gas to be introduced into a plasma treatment chamber may be any gas as long as a plasma gas is stably generated. In addition, a gas containing an inert gas in a range of 97.0% by volume or more and 99.99% by volume or less and an active gas in a range of 0.01% by volume or more and 3.0% by volume or less is preferable.

Examples of the Inert Gas Include Nitrogen and Argon.

Examples of the Active Gas Include Oxygen, Hydrogen, and Carbon Monoxide.

As described above, in the carbon electrode of the present invention, all of the contact angles $\theta_A$ of water on both surfaces of the carbon electrode in the thickness direction and the contact angle $\theta_B$ of water in the middle portion of the carbon electrode in the thickness direction are controlled within specific ranges. In this way, when the contact angle of water is low and excellent hydrophilicity is provided not only on the surface of the carbon electrode but also on the middle portion of the carbon electrode in the thickness direction, high reaction activity of the electrode is provided over the entire body in the thickness direction. For this reason, when the carbon electrode of the present invention is used for a redox flow battery, excellent battery characteristics can be obtained.

Also, in the carbon electrode of the present invention, the reaction activity of the electrode is further increased by controlling the thickness, the basis weight, and the specific surface area within specific ranges.

Although the present invention will be described in detail below with reference to Examples, the present invention is not limited by the following description.

[Measurement of Contact Angle of Water]

In contact angles $\theta_A$ of water on both surfaces of a carbon electrode in a thickness direction, a contact angle of water per sample was measured at a total of 10 points, i.e., 5 points on each of a front surface and a rear surface using a contact angle meter (manufactured by Matsubo Co., Ltd.) and an average value thereof was used as the contact angles $\theta_A$. Measurement positions were set at 5 points which were even in a sheet width direction. In a contact angle $\theta_B$ of a middle portion of the carbon electrode in the thickness direction, a double-sided tape was applied on both surfaces of the carbon electrode, the double-sided tape was peeled off to expose a surface of the carbon electrode in the middle portion thereof in the thickness direction, the contact angle of water was measured at 10 points per sample, and the average value thereof was used as the contact angle $\theta_B$. A position of the surface of the carbon electrode in the middle portion thereof in the thickness direction to be used for the measurement was a portion at a position of 0.4 to 0.6 with respect to a thickness 1 of the carbon electrode.

[Evaluation of Battery Characteristics]

Battery characteristics of a redox flow battery using a carbon electrode of each example were measured as follows.

The carbon electrode was cut into an electrode area of 9 cm$^2$ with 3 cm in an upward/downward direction (a liquid passage direction) and 3 cm in a width direction and a cell was assembled. When a carbon electrode having a thin thickness is used so that the thickness of the carbon electrode was 0.60 mm, adjustment was performed in accordance with the number of sheets to be used. Nafion 212 membrane was used as an ion exchange membrane. Charging was performed up to 1.45 V at 70 mA/cm$^2$ and discharge characteristics were confirmed using an electrochemical measuring device manufactured by Solartron. The results are shown in Tables 1 and 2 as maximum power densities. Furthermore, a 3.0 mol/L aqueous sulfuric acid solution of 1.0 mol/L vanadium oxysulfate was used as a positive electrode electrolytic solution and 3.0 mol/L aqueous sulfuric acid solution of 1.0 mol/L vanadium sulfate was used as a negative electrode electrolytic solution. The amount of electrolytic solution was set to a large excess with respect to a cell and piping. The liquid flow rate was 20 mL/min and was measured at 30° C.

[Specific Surface Area]

The specific surface area of a carbon electrode was measured through a mercury injection method using a mercury porosimeter.

[Measurement of Penetration Resistance]

The penetration resistance of a carbon electrode was measured through the following method.

A circular sample piece of 10.2 cm$^2$ punched outside of the carbon electrode was arranged between a pair of conductive plates and a voltage when a current of 10 mA was applied while applying a pressure of 1020 N from above and below the conductive plates was measured and calculated as a resistance value in a unit area of the carbon electrode.

A low resistance meter (Agilent 34420A manufactured by Agilent) was used as a measuring device.

Example A1

A dispersion liquid was prepared by uniformly dispersing 100 parts by mass of carbon fibers (PAN-based carbon fibers; an average fiber diameter of 7 μm; and an average fiber length of 3 mm) in water, disintegrating the carbon fibers into single fibers, when sufficient dispersion was determined to be performed, and uniformly dispersing 80 parts by mass of polyethylene pulp (manufactured by Mitsui Chemicals, Inc.; trade name SWP) and 20 parts by mass of PVA fiber (manufactured by Kuraray Co., Ltd.; "VPB105-1;" an average fiber length: 3 mm) as binder fibers.

Paper was made from the dispersion liquid and then dried to obtain a carbon fiber sheet with a basis weight of 40 g/m$^2$.

A resin-impregnated carbon fiber sheet with a basis weight of 60 g/m$^2$ was obtained by impregnating a carbon fiber sheet in a methanol solution containing 30% by mass of a phenolic resin (manufactured by DIC Corporation; "Phenolite J-325") as a thermosetting resin and drying the carbon fiber sheet at 40° C. for 15 minutes using a hot air dryer.

A resin-cured carbon fiber sheet was obtained by subjecting the resin-impregnated carbon fiber sheet to heat press processing under the conditions such as 250° C. and 10 MPa for 1 minutes using a double belt press machine.

A porous carbon electrode with a thickness of 200 μm was obtained by subjecting the resin-cured carbon fiber sheet to carbonization in a carbonization furnace through heating at 2000° C. in a nitrogen gas atmosphere for 15 minutes.

A hydrophilic porous carbon electrode was obtained by passing the porous carbon electrode in a furnace at 680° C. in an air atmosphere while transporting the porous carbon electrode and subjecting the porous carbon electrode to a heat treatment for 3 minutes while causing air to flow in a direction perpendicular to a direction in which the porous carbon electrode is transported in the furnace.

Contact angles $\theta_A$ of water on both surfaces of the obtained hydrophilic porous carbon electrode in the thickness direction were 3° and 4° and a contact angle $\theta_B$ of water in a middle portion of the obtained hydrophilic porous carbon electrode in the thickness direction was 5°.

Example A2

A porous carbon electrode was obtained in the same manner as in Example A1.

A hydrophilic porous carbon electrode was obtained by passing the porous carbon electrode at 680° C. in an air atmosphere in a furnace while transporting the porous carbon electrode, subjecting the porous carbon electrode to a heat treatment for 3 minutes while causing air to flow in a direction perpendicular to a direction in which the porous carbon electrode is transported in the furnace, and further subjecting the porous carbon electrode to an atmospheric pressure plasma treatment. In the atmospheric pressure plasma treatment, a mixed gas of nitrogen:oxygen=99.99: 0.0100 (% by volume) was used as an introduction gas into a plasma treatment chamber of an atmospheric pressure plasma device AP-T03-S230 (Sekisui Chemical Co., Ltd.) and introduced at 75 L/min. The porous carbon electrode was subjected to a plasma treatment at an output of 375 W for 0.5 seconds in a state in which an ejection port of a plasma gas of the plasma device was placed 3 mm away from a surface of the porous carbon electrode so that the plasma gas was blown to the porous carbon electrode from a perpendicular direction of the porous carbon electrode. This treatment was performed on both surfaces of the porous carbon electrode.

Contact angles $\theta_A$ of water on both surfaces of the obtained hydrophilic porous carbon electrode in the thickness direction are 2° and 3° and a contact angle $\theta_B$ of water on a middle portion of the obtained hydrophilic porous carbon electrode in the thickness direction is 5°.

Comparative Example A1

A porous carbon electrode was obtained in the same manner as in Example A1.

The porous carbon electrode was immersed in an aqueous solution (25° C.) with a nitric acid concentration of 3 mol/L for 2 minutes, subjected to an electrolytic treatment, washed with water, and then dried.

Contact angles $\theta_A$ of water on both surfaces of the obtained porous carbon electrode in the thickness direction are 32° and 34° and a contact angle $\theta_B$ of water in a middle portion of the porous carbon electrode in the thickness direction is 38°.

Comparative Example A2

A porous carbon electrode was obtained in the same manner as in Example A1.

The porous carbon electrode was immersed in an aqueous solution (25° C.) with a nitric acid concentration of 3 mol/L for 2 minutes, subjected to an electrolytic treatment, washed with water, dried, and then subjected to an atmospheric pressure plasma treatment. In the atmospheric pressure plasma treatment, a mixed gas of nitrogen:oxygen=99.99: 0.0100 (% by volume) was used as an introduction gas into a plasma treatment chamber of an atmospheric pressure plasma device AP-T03-S230 (Sekisui Chemical Co., Ltd.) and introduced at 75 L/min. The porous carbon electrode was subjected to a plasma treatment at an output 375 W for 0.5 seconds in a state in which an ejection port of a plasma gas of a plasma device was placed 3 mm away from both surfaces of the porous carbon electrode so that the plasma gas was blown to the porous carbon electrode from a perpendicular direction of the porous carbon electrode. Contact angles $\theta_A$ of water on both surfaces of the obtained porous carbon electrode in the thickness direction were 19° and 18° and a contact angle $\theta_B$ of water in a middle portion of the obtained porous carbon electrode in the thickness direction was 25°.

Comparative Example A3

A porous carbon electrode was obtained in the same manner as in Example A1 except that the porous carbon electrode was not subjected to a hydrophilization treatment.

Table 1 shows the evaluation results of the battery characteristics of the redox flow battery using the carbon electrode of each example.

TABLE 1

|  | Contact angle of water [°] | | | Output density [mW/cm$^2$] |
| --- | --- | --- | --- | --- |
|  | $\theta_A$ | | $\theta_B$ |  |
| Example A1 | 3 | 4 | 5 | 1125 |
| Example A2 | 2 | 3 | 5 | 1165 |
| Comparative Example A1 | 32 | 34 | 38 | 890 |
| Comparative Example A2 | 19 | 18 | 25 | 926 |
| Comparative Example A3 | 98 | 104 | 100 | 420 |

As shown in Table 1, redox flow batteries using the hydrophilic porous carbon electrodes of Examples A1 and A2 in which all of the contact angles $\theta_A$ and the contact angle $\theta_B$ were within a range of 0 to 15° had excellent battery characteristics.

Redox flow batteries using the porous carbon electrodes of Comparative Examples A1 to A3 in which at least one of the contact angles $\theta_A$ and the contact angle $\theta_B$ was outside of a range of 0 to 15° had inferior battery characteristics.

Example B1

A dispersion liquid was prepared by uniformly dispersing 100 parts by mass of carbon fibers (PAN-based carbon fibers; an average fiber diameter of 7 μm and an average fiber length of 3 mm) in water, disintegrating the carbon fibers into single fibers, when sufficient dispersion was determined to be performed, and uniformly dispersing 80 parts by mass of polyethylene pulp (manufactured by Mitsui Chemicals, Inc., trade name SWP) and 20 parts by mass of PVA fiber (manufactured by Kuraray Co., Ltd.; "VPB105-1;" an average fiber length of 3 mm) as binder fibers.

Paper was made from the dispersion liquid and then dried to obtain a carbon fiber sheet with a basis weight of 40 g/m$^2$.

A resin-impregnated carbon fiber sheet with a basis weight of 60 G/m$^2$ was obtained by immersing a carbon fiber sheet in a dispersion liquid obtained by dispersing 30% by mass of a phenolic resin (manufactured by DIC Corporation; "Phenolite J-325") in methanol as a thermosetting resin to impregnate the carbon fiber sheet in the thermosetting resin and drying the carbon fiber sheet at 60° C. for 15 minutes using a hot air dryer.

A resin-cured carbon fiber sheet was obtained by subjecting the resin-impregnated carbon fiber sheet to heat press processing under the conditions such as 250° C. and 10 mPa for 1 minutes using a double belt press machine.

A porous carbon electrode with a thickness of 210 μm was obtained by subjecting the resin-cured carbon fiber sheet to carbonization in a carbonization furnace through heating at 2000° C. in a nitrogen gas atmosphere for 15 minutes.

The porous carbon electrode was immersed in a dispersion liquid obtained by dispersing 10% by mass of $Ag_2O$ (manufactured by NACALAI TESQUE, INC.) in water to impregnate $Ag_2O$ and dried at 100° C. for 1 hour using a hot air dryer.

A hydrophilic porous carbon electrode was obtained by passing the porous carbon electrode having $Ag_2O$ supported therein in a furnace at 400° C. in an air atmosphere while transporting the porous carbon electrode and subjecting the porous carbon electrode to a heat treatment for 10 minutes while causing air to flow in a direction perpendicular to a direction in which the porous carbon electrode is transported in the furnace. The thickness of the obtained hydrophilic porous carbon electrode was 0.21 mm and a basis weight thereof was 57 g/m², and the specific surface area thereof was 6.6 m²/g.

Example B2

A hydrophilic porous carbon electrode was prepared in the same manner as in Example B1 except that amounts of carbon fibers, binder fibers, and a thermosetting resin to be used were adjusted and a porous carbon sheet with a thickness of 630 μm was used. The thickness of the obtained hydrophilic porous carbon electrode was 0.63 mm, the basis weight thereof was 178 g/m², and the specific surface area thereof was 7.2 m²/g.

Comparative Example B1

A porous carbon electrode was prepared by performing the dispersing to the heat treatment in the same manner as in Example B1 except that $TiO_2$ was used instead of $Ag_2O$. The thickness of the obtained porous carbon electrode was 0.21 mm, the basis weight thereof was 65 g/m², and the specific surface area thereof was 1.2 m²/g.

Comparative Example B2

A porous carbon electrode was prepared by performing the dispersing to the heat treatment in the same manner as in Example B1 except that $SnO_2$ was used instead of $Ag_2O$. The thickness of the obtained porous carbon electrode was 0.21 mm, the basis weight thereof was 66 g/m², and the specific surface area thereof was 2.4 m²/g.

Comparative Example B3

A porous carbon electrode was obtained in the same manner as in Example B1 except that an impregnation treatment and a heat treatment of a dispersion liquid of $Ag_2O$ were not performed. The thickness of the obtained porous carbon electrode was 0.21 mm, the basis weight thereof was 62 g/m², and the specific surface area thereof was 0.9 m²/g.

Table 2 shows the measurement results of thickness, basis weight, specific surface area, contact angles $\theta_A$, a contact angle $\theta_B$, and a penetration resistance of a porous carbon electrode of each example and the evaluation results of the battery characteristics of a redox flow battery using the porous carbon electrode.

TABLE 2

| | Porous carbon electrode | | | | | | | |
|---|---|---|---|---|---|---|---|---|
| | Type of metal oxide | Thickness [mm] | Basis weight [g/m²] | Specific surface area [m²/g] | Penetration resistance [mΩ·cm²] | Contact angle of water [°] | | Output density [mW/cm²] |
| | | | | | | $\theta_A$ | $\theta_B$ | |
| Example B1 | $Ag_2O$ | 0.21 | 57 | 6.6 | 3.5 | 5 4 | 9 | 1100 |
| Example B2 | $Ag_2O$ | 0.63 | 178 | 7.2 | 5.9 | 9 8 | 10 | 1123 |
| Comparative Example B1 | $TiO_2$ | 0.21 | 65 | 1.2 | 5.7 | 34 43 | 38 | 890 |
| Comparative Example B2 | $SnO_2$ | 0.21 | 66 | 2.4 | 5.8 | 33 37 | 39 | 880 |
| Comparative Example B3 | — | 0.21 | 62 | 0.9 | 5.6 | 98 99 | 95 | 420 |

As shown in Table 2, the hydrophilic porous carbon electrode of Examples B1 and B2 in which all of the contact angles $\theta_A$ and the contact angle $\theta_B$ were within a range of 0 to 15° and the thickness, the basis weight, and the specific surface area were in specific ranges had excellent battery characteristics of redox flow batteries.

On the other hand, the porous carbon electrodes of Comparative Examples B1 and B2 in which the contact angles $\theta_A$ and the contact angle $\theta_B$ were large and Comparative Example B3 in which the contact angles $\theta_A$ and the contact angle $\theta_B$ were large and the specific surface area was small had inferior battery characteristics of redox flow batteries.

What is claimed is:

1. A porous carbon electrode which is a porous carbon electrode sheet in which carbon fibers are bonded using a resin carbide,
    wherein contact angles $\theta_A$ of water on both surfaces of the porous carbon electrode in a thickness direction are 0 to 15° and a contact angle $\theta_B$ of water in a middle portion of the porous carbon electrode in the thickness direction is 0 to 15°,
    a specific surface area of the porous carbon electrode is 1.0 to 1000 m²/g, and
    wherein Ag is present on a surface of the porous carbon electrode.

2. The porous carbon electrode according to claim 1, wherein the contact angles $\theta_A$ of water on both surfaces of the porous carbon electrode in the thickness direction are 0 to 10° and the contact angle $\beta_B$ of water in the middle portion of the porous carbon electrode in the thickness direction is 0 to 15°.

3. The porous carbon electrode according to claim 1, wherein the porous carbon electrode is a hydrophilic porous carbon electrode, wherein differences between the contact angles $\theta_A$ of water on both surfaces of the hydrophilic porous carbon electrode in the thickness direction and the contact angle $\beta_B$ of water in the middle portion of the hydrophilic porous carbon electrode in the thickness direction are 0 to 10°.

4. The porous carbon electrode according to claim 1, wherein a basis weight is 30 to 300 g/m$^2$ and a thickness is 0.10 to 0.80 mm.

5. The porous carbon electrode according to claim 1, wherein non-through holes with a size of an opening portion of 0.1 to 5.0 μm and a depth of 0.01 to 1.0 μm are formed in surfaces of the carbon fibers.

6. The porous carbon electrode according to claim 1. wherein a penetration resistance of the porous carbon electrode is 3.0 to 6.0 mΩ·cm$^2$.

7. The porous carbon electrode according to claim 1, wherein either or both of a Ti oxide and a Sn oxide are present on a surface of the porous carbon electrode.

8. A manufacturing method of the porous carbon electrode according to claim 1, comprising
the following Steps (1) to (5):
Step (1): a step of forming carbon fibers and a binder fiber into a sheet to obtain a carbon fiber sheet;
Step (2): a step of impregnating the carbon fiber sheet in a thermosetting resin to obtain a resin-impregnated carbon fiber sheet;
Step (3): a step of subjecting the resin-impregnated carbon fiber sheet to heat press processing to obtain a resin-cured carbon fiber sheet;
Step (4): a step of subjecting the resin-cured carbon fiber sheet to carbonization at 400 to 3000° C. in an inert atmosphere to obtain a hydrophilic porous carbon electrode; and
Step (5): a step of carrying out a hydrophilization treatment by transporting the porous carbon electrode and subjecting the porous carbon electrode to a heat treatment while causing an oxidizing gas at 400 to 800° C. to flow in a direction perpendicular to a direction in which the porous carbon electrode is transported.

9. The manufacturing method of the porous carbon electrode according to claim 8, wherein the porous carbon electrode is subjected to the heat treatment for 0.5 to 60 minutes using the oxidizing gas.

10. The manufacturing method of the porous carbon electrode according to claim 8, wherein, in Step (5), the porous carbon electrode is further in mersed in a nitric acid solution, subjected to an electrolytic treatment, washed with water, and dried.

11. The manufacturing method of the porous carbon electrode according to claim 8, wherein, in Step (5), both surfaces of the porous carbon electrode are further subjected to an atmospheric pressure plasma treatment.

12. The manufacturing method of the porous carbon electrode according to claim 8, wherein, in Step (4), the porous carbon electrode is further impregnated in a dispersion liquid of a metal oxide to support the metal oxide.

13. A manufacturing method of the porous carbon electrode, which is a porous carbon electrode sheet in which carbon fibers are bonded using a resin carbide,
wherein contact angles $\theta_A$ of water on both surfaces of the porous carbon electrode in a thickness direction are 0 to 15 ° and a contact angle $\theta_B$ of water in a middle portion of the porous carbon electrode in the thickness direction is 0 to 15°, and
a specific surface area of the porous carbon electrode is 1.0 to 1000 m$^2$/g,
the method comprising:
the following Steps (1) to (5):
Step (1): a step of forming carbon fibers and a binder fiber into a sheet to obtain a carbon fiber sheet;
Step (2): a step of impregnating the carbon fiber sheet in a thermosetting resin to obtain a resin-impregnated carbon fiber sheet;
Step (3): a step of subjecting the resin-impregnated carbon fiber sheet to heat press processing to obtain a resin-cured carbon fiber sheet;
Step (4): a step of subjecting the resin-cured carbon fiber sheet to carbonization at 400 to 3000° C. in an inert atmosphere to obtain a hydrophilic porous carbon electrode; and
Step (5): a step of carrying out a hydrophilization treatment by transporting the porous carbon electrode and subjecting the porous carbon electrode to a heat treatment while causing an oxidizing gas at 400 to 800 ° C to low in a direction perpendicular to a direction in which the porous carbon electrode is transported.

14. The manufacturing method of the porous carbon electrode according to claim 13, wherein the porous carbon electrode is subjected to the heat treatment for 0.5 to 60 minutes using the oxidizing gas.

15. The manufacturing method of the porous carbon electrode according to claim 13, wherein, in Step (5), the porous carbon electrode is further immersed in a nitric acid solution, subjected to an electrolytic treatment, washed with water, and dried.

16. The manufacturing method of the porous carbon electrode according to claim 13, wherein, in Step (5), both surfaces of the porous carbon electrode are further subjected to an atmospheric pressure plasma treatment.

17. The manufacturing method of the porous carbon electrode according to claim 13, wherein, in Step (4), the porous carbon electrode is further impregnated in a dispersion liquid of a metal oxide to support the metal oxide.

* * * * *